United States Patent
Kolic

[11] 3,813,077
[45] May 28, 1974

[54] HOSE CLAMP
[76] Inventor: Edwin S. Kolic, 544 Knights Ave., Gahanna, Ohio 43230
[22] Filed: June 29, 1972
[21] Appl. No.: 267,463

[52] U.S. Cl. .................................. 251/9, 24/134 R
[51] Int. Cl. ............................................. F16k 7/06
[58] Field of Search ........ 24/134 E, 134 P, 134 EA, 24/134 KC, 134 R, 248 CR; 251/4–10; 339/274

[56] References Cited
UNITED STATES PATENTS

| | | | |
|---|---|---|---|
| 653,629 | 7/1900 | Schneider | 251/6 |
| 820,216 | 5/1906 | Leffigwel et al. | 251/10 |
| 1,432,882 | 10/1922 | Lobl | 251/6 |
| 1,876,488 | 9/1932 | Lormor | 251/9 |
| 2,063,696 | 12/1936 | Oxley | 251/9 X |
| 3,034,504 | 5/1962 | Winsor et al. | 251/9 X |
| 3,167,085 | 1/1965 | Redmer | 251/8 X |
| 3,256,579 | 6/1966 | Hoover | 24/134 R |
| 3,459,213 | 8/1969 | Schenck et al. | 251/368 X |

FOREIGN PATENTS OR APPLICATIONS 202,470  8/1923  Great Britain ........................ 251/9

Primary Examiner—Alan Cohan
Assistant Examiner—Richard Gerard
Attorney, Agent, or Firm—Sandoe, Hopgood and Calimafde

[57] ABSTRACT

The invention contemplates a hose clamp comprising an elongate channel frame with opposed upstanding side walls from which a compression drum is pivotally suspended. The hose-compression surface of the drum is arcuate and generally cylindrical, and the pivot axis is substantially diametriclly opposed to the circumferentially central region of the generally cylindrical surface. An integral handle brings the drum to a dead-center relation in proximity with the channel bottom, at the clamped position, and in a preferred arrangement two corner edges formed in the channel bottom serve to stabilize the clamped position and to effect a double-seal closure of the hose in such position.

17 Claims, 8 Drawing Figures

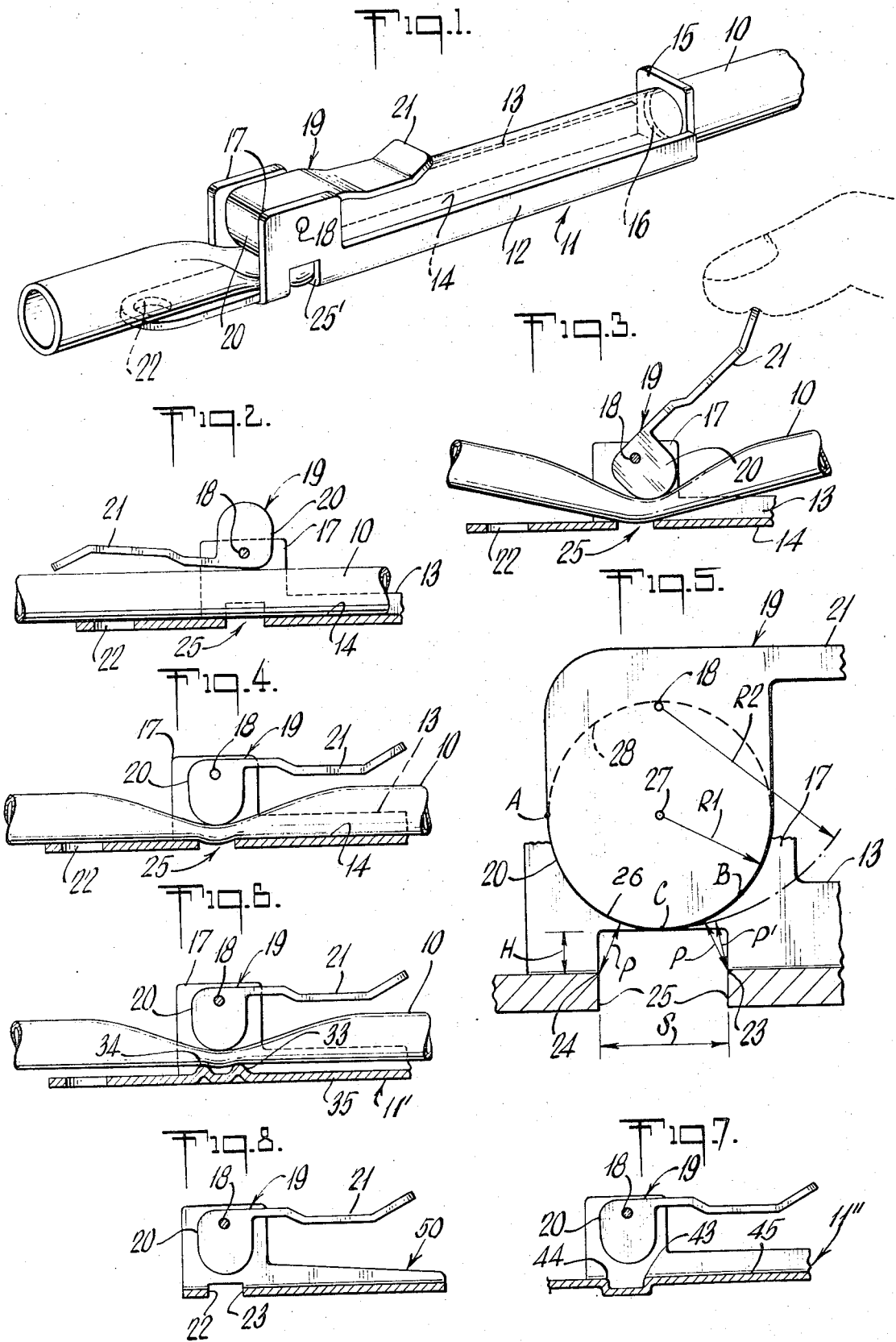

HOSE CLAMP

The invention relates to a portable hose-clamp construction, particularly of the manually operable variety, lending itself for selective throttling and closure of elastomeric tubing, as in laboratory and hospital applications.

It is an object to provide an improved clamp device of the character indicated.

Another object is to provide such a clamp which is inherently self-locking in closed position and yet which is smooth-throttling in action, in approach to and away from the closed position.

A further object is to provide a construction meeting the above objects with basic simplicity, enhanced ease of control and reliability, and low cost.

Other objects and various further features of the invention will be pointed out or will occur to those skilled in the art from a reading of the following specification in conjunction with the accompanying drawings. In said drawings, which show, for illustrative purposes only, preferred forms of the invention:

FIG. 1 is a perspective view of a hose to which a clamp of the invention has been applied;

FIGS. 2, 3 and 4 are similar longitudinal sectional views through one side of the clamp of FIG. 1, to show different relationships;

FIG. 5 is an enlarged simplified diagram to enable identification of proportional relationships for the clamp of FIG. 1; and FIGS. 6, 7 and 8 are similar to FIG. 4, to illustrate modifications.

Referring to FIG. 1, the invention is shown in application to a two-piece clamp for selectively adjustable compressional closure of an elastomeric hose or tube 10 which may be one of a variety of standard relatively soft hoses, as for example, pure-gum tubing, latex tubing, polyvinylchloride tubing, neoprene and butyl-rubber tubing, silicon tubing, etc. A frame member 11 comprises an elongate channel with opposed upstanding side walls 12–13, and a bottom wall 14 therebetween. A bracket 15 is bent up from one end of the bottom wall and has an opening 16, which serves as a gage to enable the user to know that he is employing the clamp for tubing of correct size, and which also serves a hose-positioning function for inserted hose of correct size. At the other end, the side walls 12 are extended at bracket plate portions 17 which are pierced to receive pivot means 18 for the actuable member 19. Member 19 may be of integral construction, comprising a compression-drum portion 20, the pivot means 18, and an actuating handle 21. For convenience, the bottom wall 14 extends or projects beyond the region of drum suspension, to provide extended aligning support for tube 10, and to enable a clamped hose to be hung from suitable means (not shown) engageable with an aperture 22. FIGS. 2, 3, and 4 respectively show successive actuated-positions, from full-open (FIG. 2) to full-closed (FIG. 4).

It is a feature of preferred forms of the invention that two spaced corner edges be presented to the underside of hose 10 at the region of drum compression. In the form of FIGS. 1 to 5, these edges are adjacent corners 23–24 of a rectangular opening 25 cut from the bottom wall 14 directly beneath the axis of pivot means 18. Preferably, the corner edges 23–24 extend the full transverse extent of the channel bottom 14 and are spaced to the extent of a longitudinal span S which is symmetrically astride a plane normal to bottom 14 and through the transverse axis of pivot means 18; as shown, the opening 25 continues through the lower part of plate portions 17, being indicated at 25', and extending upward, above bottom 14, to the extent H, which represents the greatest approach of drum 20 to the bottom panel 14. More specifically, the compression drum 20 has an arcuate compression surface 26 which is substantially cylindrical, i.e., with a generally circular arcuate contour, of radius $R_1$ about an axis 27, as seen in FIG. 5; this surface 26 extends preferably at least approximately $3(\pi/4)$ radians, from a point A of substantial relief from throttling, to a point B past the region of possible drum contact with tube 10. Preferably, the pivot axis at 18 is substantially diametrically opposed to the circumferentially central region C of surface 26 (i.e., between points A and B); thus, pivot means 18 is shown to be substantially on the $R_1$ circle which determines surface 26, so that pivot action establishes an orbit of radius $R_2$ for the point C of greatest offset from the pivot axis, and this radius $R_2$ is substantially twice the radius $R_1$ of drum surface 26. At the same time, arm 21 connects substantially in line with pivot means 18 and tangentially to the $R_1$ circle, as will be clear from observing the phantom indication 28 thereof.

With the described structure, the region C is positioned between like pinch throats P, defined between the respective corner edges 23–24 and adjacent regions of surface 26. The magnitude of these throats will necessarily depend upon the wall thickness of tube 10; generally, it is at least no more than substantially twice the tube-wall thickness, being approximately 40 percent of the drum radius $R_1$ for a smooth-acting configuration. And for the heaviest tubing made, i.e., thick wall tubing, the minimum drum clearance at the bottom wall throat should be at least no greater than substantially sixty percent of the drum radius $R_1$.

In use, tubing 10 is threaded through the positioning opening 16 and beneath the member 19 when in the retracted or open position of FIG. 2. The elongate frame channel 11 provides a convenient hand grip whereby the thumb of the same hand is available for handle engagement and manipulation, as suggested by phantom outline in FIG. 3. By the time the operator has reached the FIG. 3 position, the compression surface 26 has developed a substantial constriction of the throat at edge 23 and, of course, full constriction is more gradually approached from this point on. Maximum constriction (P') occurs as point C passes edge 23, and a slight relaxation therefrom develops as point C thereafter stabilizes between the two like throat regions P (edges 23 and 24). At this time (FIG. 4 position), point C forces a downward bulge of the tubing between edges 23–24, and flow is completely cut off, being sealed by the double action of two throats and a cylindrically arcuate bulge therebetween.

FIG. 6 illustrates a modification wherein the substantial equivalents of edges 23–24 are defined by spaced ridges 33–34 which are struck up from the bottom panel 35 of the frame channel 11', being otherwise similar to that described in connection with FIGS. 1 to 5. The double seal at pinching throats defined between ridges 33–34 and the compression drum is analogous in function to that previously described.

In the modification of FIG. 7, further equivalents of edges 23–24 are defined by spaced edges 43–44 of a rectangular cup-shaped depression or displacement of the bottom panel 45 of a channel frame 11''. Proportions and relationships remain otherwise as already described.

In the form of FIG. 8, the channel frame 50 is considerably shortened, for the situation in which thumb-controlled throttling is of less or no importance. Other parts remain as described in connection with FIGS. 1 to 5, including the definition of the throat-defining edges 23–24 at longitudinal limits of the cut-out 25.

It will be seen that the described invention meets all stated objects, that the structure is the essence of simplicity and ease of operating control, and that a wide range of flow control is available, ending in a cut-off position characterized by a double-pinch seal which is self-retaining in the cut-off position.

While the invention has been described in detail for the preferred forms shown, it will be understood that modifications may be made without departing from the invention. For example, the material of the actuated member 19 may be selected or finished appropriate to the described use. Thus, for very smooth action, the compression-drum surface 26 may be self-lubricating, as by application of such a material (e.g., polyethylene, polytetrafluoroethylene, or the like) to a metal part 19, or by forming the part 19 as a single injection-molded product of polyethylene or other suitable self-lubricating plastic.

What is claimed is:

1. A hose clamp, comprising a channel frame having a bottom wall and two opposed upstanding side walls, and a compression drum having an arcuate compression surface that is substantially cylindrical, means pivotally suspending said drum from and between said side walls on an axis parallel to and offset away from the central axis of said substantially cylindrical surface and from a location substantially diametrically opposed to the circumferentially central region of said substantially cylindrical surface, the pivot-axis offset from said bottom wall exceeding the diameter of the generally circular contour which characterizes said substantially cylindrical surface, and actuating means integral with said drum, the inner surface of said bottom wall being characterized by two transversely extending hose-pinching edges substantially symmetrically positioned on opposite longitudinal sides of the plane normal to the channel bottom and through the axis of pivotal suspension, said bottom wall being so characterized that said hose-pinching edges define with said drum surface throats at which said bottom wall has greatest proximity to said drum surface.

2. A hose clamp according to claim 1, in which said hose-pinching edges are longitudinally spaced to an extent which approximates the radius of said generally circular contour.

3. A hose clamp according to claim 2, in which the minimum clearance between said drum and each of said corner edges is at least no greater than substantially 60 percent of the radius of said generally circular contour.

4. A hose clamp according to claim 3, in which said minimum clearance is in the order of 40 percent of said radius.

5. A hose clamp according to claim 1, in which the mininum clearance between said drum and the bottom wall is at least no greater than substantially 60 percent of the radius of said generally circular contour.

6. A hose clamp according to claim 5, in which said minimum clearance is in the order of forty percent of said radius.

7. A hose clamp according to claim 1, in which said bottom wall has an opening extending between said side walls and for the longitudinal span between said hose-pinching edges, said edges being defined by corners of said opening.

8. A hose clamp according to claim 1, in which said hose-pinching edges are defined by transverse ridges struck up from said bottom wall in the direction of reducing the gap to said drum.

9. A hose clamp according to claim 1, in which said hose-pinching edges are defined by longitudinal limits of a cupped-depression of said bottom wall in the region beneath the pivot axis.

10. A hose clamp according to claim 1, in which said actuating means is a handle member extending tangentially to the general circle of said contour and at a location substantially diametrically opposite the circumferentially central region of said substantially cylindrical surface.

11. A hose clamp according to claim 10, in which said drum, handle and pivot means are rigidly united.

12. A hose clamp according to claim 11, in which said drum, handle and pivot means are of metal, with a coating of low-friction material on said drum.

13. A hose clamp according to claim 10, in which said drum and handle are of injection-molded self-lubricating plastic construction.

14. A hose clamp according to claim 1, in which said frame is a single piece of formed sheet metal.

15. A hose clamp according to claim 1, in which said channel frame is elongate and includes a hose guide at a location longitudinally offset from said drum and pivot.

16. A hose clamp, comprising a channel frame having a bottom wall and two upstanding side walls, and a compression drum having an arcuate compression surface that is substantially cylindrical, means on said side walls pivotally supporting said drum between said side walls on an axis parallel to and offset away from the central axis of said substantially cylindrical surface, said offset being also in the direction diametrically opposed to the circumferentially central region of said substantially cylindrical surface, the pivot-axis offset from said bottom wall exceeding the diameter of the generally circular contour which characterizes said substantially cylindrical surface, and actuating means integral with said drum, the inner surface of said bottom wall being characterized by two transversely extending hose-pinching edges substantially symmetrically positioned on opposite longitudinal sides of the plane normal to the channel bottom being so characterized that said hose-pinching edges define with said drum surface throats at which said bottom wall has greatest proximity to said drum surface.

17. A hose clamp, comprising a channel frame having a bottom wall and two upstanding side walls, and a compression drum having an arcuate compression surface that is substantially cylindrical, means on said side walls pivotally supporting said drum between said side walls on an axis parallel to and offset away from the central axis of said substantially cylindrical surface, said offset being also in the direction diametrically opposed to the circumferentially central region of said substantially cylindrical surface, the pivot-axis offset from said bottom wall exceeding the diameter of the generally circular contour which characterizes said substantially cylindrical surface, said drum including manually operable means for rotating the same about the pivot axis, said manual means being operative to position said drum in closed position of greatest approach to said bottom wall and in variously opened positions removed from said closed position, and the inner surface of said bottom wall having a transversely extending recess extending between said side walls and local to the longitudinal region of drum support and defining two transversely extending hose-pinching edges on opposite longitudinal sides of the plane normal to the channel bottom and through the pivot axis, said edges defining with said drum in closed position two like spaced pinch throats in orientations similarly but oppositely inclined on opposite sides of said normal plane, said bottom wall being so characterized that said throats define the locations of greatest proximity of said bottom wall and of said drum surface.

* * * * *